US011653667B2

(12) United States Patent
Seo et al.

(10) Patent No.: US 11,653,667 B2
(45) Date of Patent: May 23, 2023

(54) CHOCOLATE COMPOSITION HAVING IMPROVED PROCESSABILITY, AND PREPARATION METHOD THEREFOR

(71) Applicant: SAMYANG CORPORATION, Seoul (KR)

(72) Inventors: Il Seo, Gwangju-si (KR); Bong Chan Kim, Seoul (KR); Yong-In Kim, Yongin-si (KR); Seung Mi Lee, Hwaseong-si (KR); Su Youn Lim, Seoul (KR); Hye Jin Lim, Seongnam-si (KR); Tae-Chul Han, Yongin-si (KR); Jung Sook Han, Anyang-si (KR)

(73) Assignee: SAMYANG CORPORATION, Seoul (KR)

( * ) Notice: Subject to any disclaimer, the term of this patent is extended or adjusted under 35 U.S.C. 154(b) by 726 days.

(21) Appl. No.: 16/344,977

(22) PCT Filed: Oct. 31, 2017

(86) PCT No.: PCT/KR2017/012173
§ 371 (c)(1),
(2) Date: Apr. 25, 2019

(87) PCT Pub. No.: WO2018/084538
PCT Pub. Date: May 11, 2018

(65) Prior Publication Data
US 2019/0269140 A1 Sep. 5, 2019

(30) Foreign Application Priority Data

Nov. 1, 2016 (KR) .......................... 10-2016-0144818
Nov. 1, 2016 (KR) .......................... 10-2016-0144819

(51) Int. Cl.
| | |
|---|---|
| A23G 1/40 | (2006.01) |
| A21D 2/18 | (2006.01) |
| A21D 2/36 | (2006.01) |
| A21D 13/062 | (2017.01) |
| A23L 2/60 | (2006.01) |
| A23G 1/38 | (2006.01) |
| A23G 1/00 | (2006.01) |
| A23G 1/36 | (2006.01) |

(52) U.S. Cl.
CPC .............. *A23G 1/40* (2013.01); *A21D 2/181* (2013.01); *A21D 2/36* (2013.01); *A21D 13/062* (2013.01); *A23G 1/00* (2013.01); *A23G 1/36* (2013.01); *A23G 1/38* (2013.01); *A23L 2/60* (2013.01)

(58) Field of Classification Search
CPC ........ A21D 13/062; A21D 2/181; A23G 1/00; A23G 1/36; A23G 1/38; A23G 1/40; A23L 2/60
See application file for complete search history.

(56) References Cited

U.S. PATENT DOCUMENTS

| | | | |
|---|---|---|---|
| 2008/0260925 A1† | 10/2008 | Zink | |
| 2009/0304891 A1 | 12/2009 | Fujihara et al. | |
| 2015/0024109 A1 | 1/2015 | Paggios et al. | |
| 2015/0024110 A1 | 1/2015 | Paggios et al. | |
| 2016/0037795 A1 | 2/2016 | Wang et al. | |
| 2016/0066593 A1 | 3/2016 | Nielsen et al. | |
| 2016/0302463 A1 | 10/2016 | Woodyer et al. | |

FOREIGN PATENT DOCUMENTS

| | | |
|---|---|---|
| EP | 0489515 | † 6/1992 |
| EP | 2801262 | 11/2014 |
| JP | 2012-232908 | 11/2012 |
| JP | 2012232908 | † 11/2012 |
| JP | 2014-084291 | 5/2014 |
| JP | 2016-165278 | 9/2016 |
| KR | 10-2001-0012154 | 2/2001 |
| KR | 10-0593671 | 6/2006 |
| KR | 10-2007-0089932 | 9/2007 |
| KR | 10-2012-0021745 | 3/2012 |
| KR | 10-1189640 | 10/2012 |
| KR | 10-2013-0049628 | 5/2013 |
| KR | 10-1314683 | 10/2013 |
| KR | 10-1318422 | 10/2013 |
| KR | 10-1386146 | 4/2014 |
| KR | 10-2014-0107514 | 9/2014 |
| KR | 10-2015-0127065 | 11/2015 |
| KR | 10-1617379 | 5/2016 |
| KR | 10-1656063 | 9/2016 |
| WO | 2004-068962 | 8/2004 |
| WO | 2015-075473 | 5/2015 |
| WO | 2015075473 | † 5/2015 |
| WO | 2016-097067 | 6/2016 |
| WO | 2016-097068 | 6/2016 |
| WO | 2016097067 | † 6/2016 |
| WO | 2016097068 | † 6/2016 |

OTHER PUBLICATIONS

Reference book of the chocolate, the first edition, first copy published on Feb. 2, 2016 with the English translations of the cited parts in red box.
Stephen T Beckett, Chocolate—Knowledge of cacao and production technology the first edition, first copy published on Dec. 10, 2015 with the English translations of the cited parts in red box.
Ralph E. Timms, Confectionery Fats Handbook, the first edition, first copy published on Feb. 14, 2010 with the English translations of the cited parts in red box.
Surfactant in Food Field, Jan. 10, 2001 with the English translations of the cited parts in red box.
EPO, extended European search report of the corresponding EP Patent Application No. 17867567.4., dated May 18, 2020.
(Continued)

*Primary Examiner* — Jeffrey P Mornhinweg
(74) *Attorney, Agent, or Firm* — Lex IP Meister, PLLC

(57) ABSTRACT

The present invention relates to chocolate containing allulose and a method of preparing thereof, and more specifically, provides a chocolate composition having reduction of saccharides added to chocolate, masking of bitter taste of chocolate and excellent emulsion stability, and a method of preparing thereof.

19 Claims, 10 Drawing Sheets

(56) References Cited

OTHER PUBLICATIONS

Mi-Hyang Yoon et al., "Quality Characteristics and Antioxidant Activity of Chocolate Containing Flowering Cherry (*Prunus serrulata* L. var. *spontanea* Max. wils.) Fruit Powder", Journal of the Korean Society of Food Science and Nutrition, vol. 38, No. 11, pp. 1600-1605, 2009.

JiHun Shin et al., "Processing Optimization of Chocolate with Fermented and Aged Garlic Extract", Korean J. Food Culture, vol. 25, No. 2, 2010.

Ok-Kyeong Yu et al., "Quality Characteristics and the Optimization Recipes of Chocolate Added with Bokbunja (*Rubus coreanus* Miquel)", Journal of the Korean Society of Food Science and Nutrition, vol. 36, No. 9, pp. 1193-1197, 2007.

Kyung-Mi Yoo et al., "Preparation of Chocolate Added with Yuza (*Citrus junos* Seib ex TANAKA) and Its Antioxidant Characteristics", Korean J. Food Cookery Sci., vol. 24, No. 2, pp. 222-227, 2008.

Hoe-Jin Roh et al., "Application of a Low Calorie Sweetener, Tagatose, to Chocolate Product", Korean J. Food Sci. Technol., vol. 30, No. 1, pp. 237-240, 1998.

Sung Won Moon et al., "Quality Characteristics of Chocolate Blended with Bifidobacterium-fermented Isoflavone Power", Korean J. Food Sci. Technol., vol. 35, No. 6, pp. 1162-1168, 2003.

Webpage: Rare Sugar Sweet; Glucose syrup containing Rare Sugars, Matsutani Chemical industry Co,. Ltd., Jan. 6, 2016.

EPO, Third-Party Observation of EP 17867567.4 dated Apr. 1, 2021.

"Rare Sugar Sweet; Glucose syrup containing Rare Sugars", 2 pages, Jan. 6, 2016, Matsutani Chemical Industry Co., Ltd. [retrieved from https://www.matsutani.co.jp/english/products/raresugar.html].†

† cited by third party

[Fig. 1]
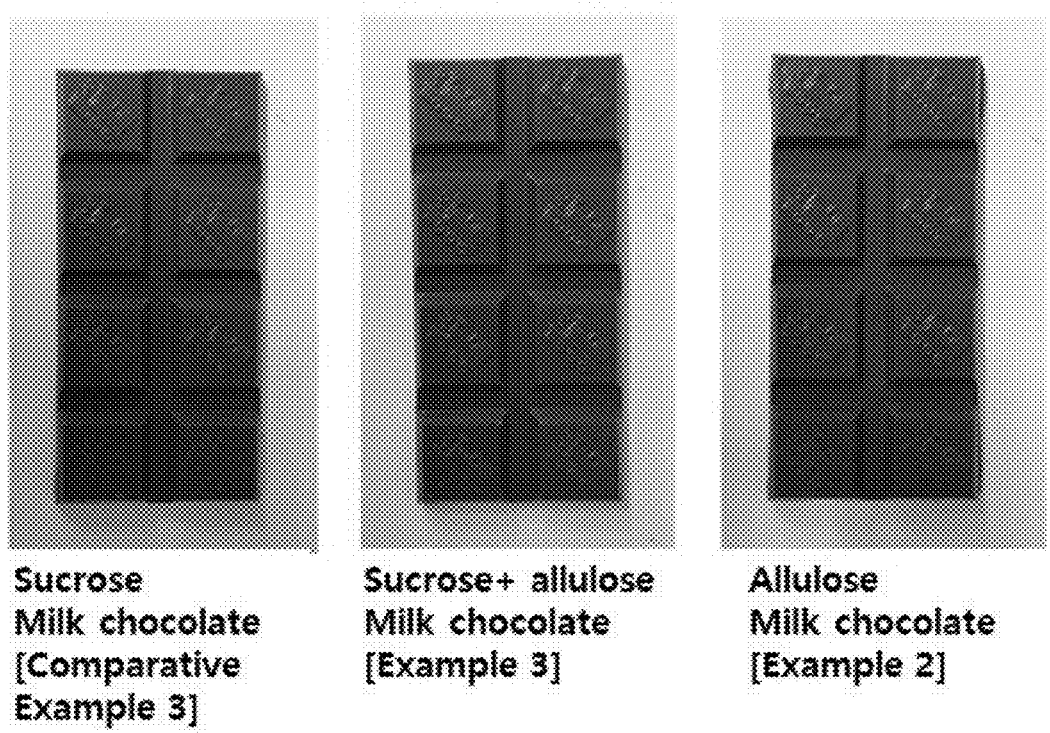

[Fig. 2]
Comparative Example 3
(sucrose)
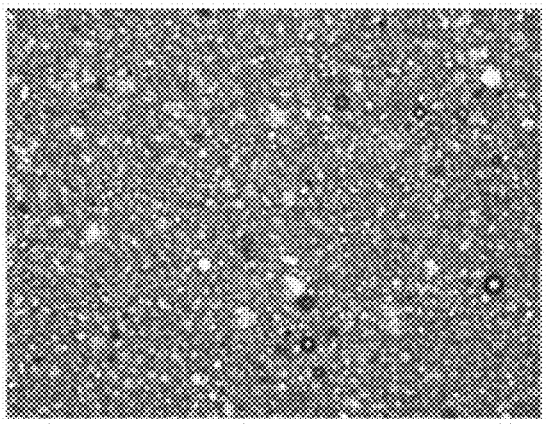
Example 3 (sucrose + allulose)        Example 2 (allulose)
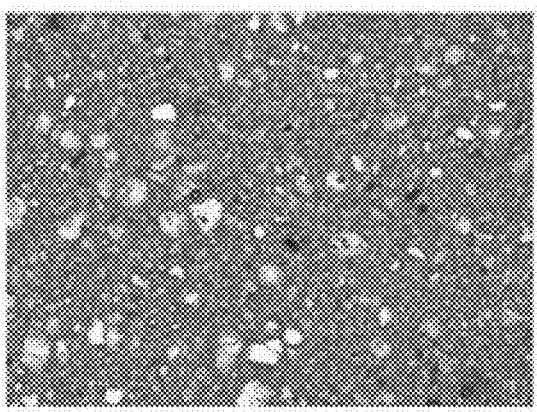
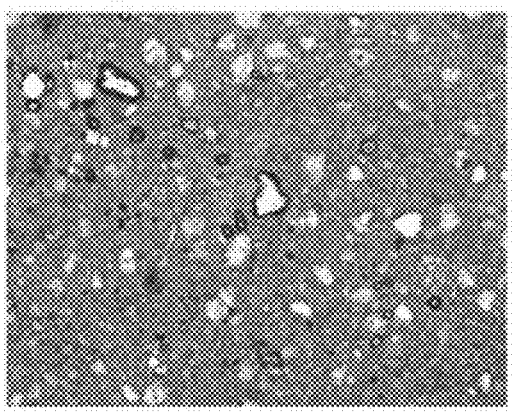

[Fig. 3]
Micrograph of milk chocolate (x 100 fold)
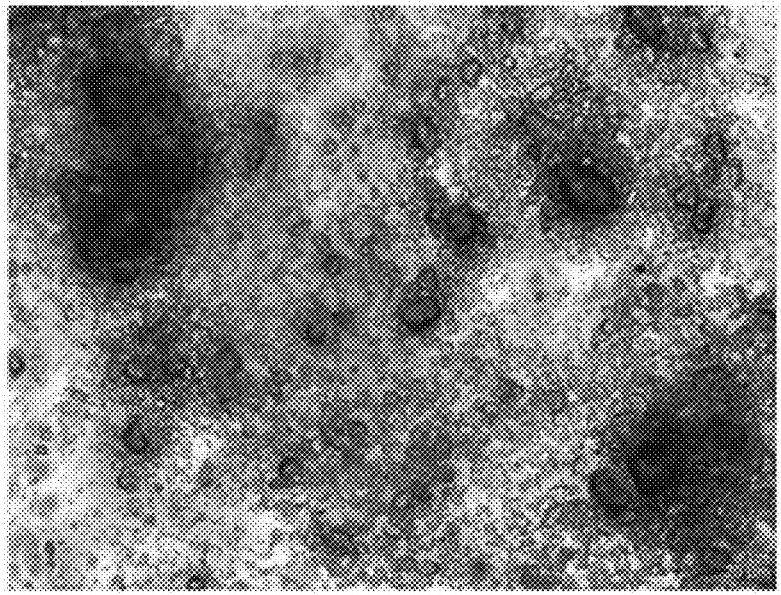
Micrograph of milk chocolate (x 200 fold)
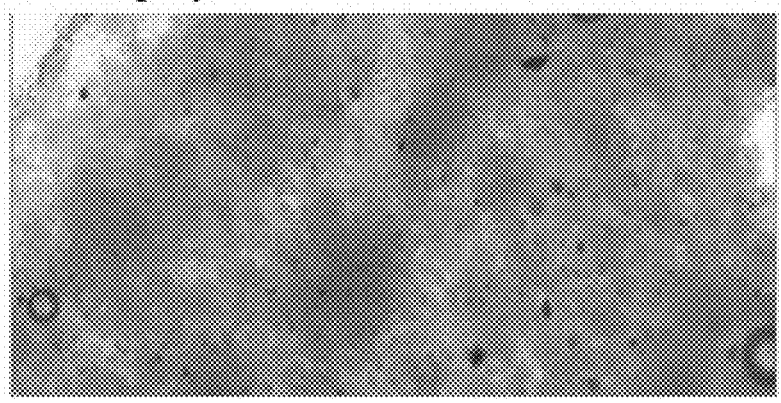

[Fig. 4]
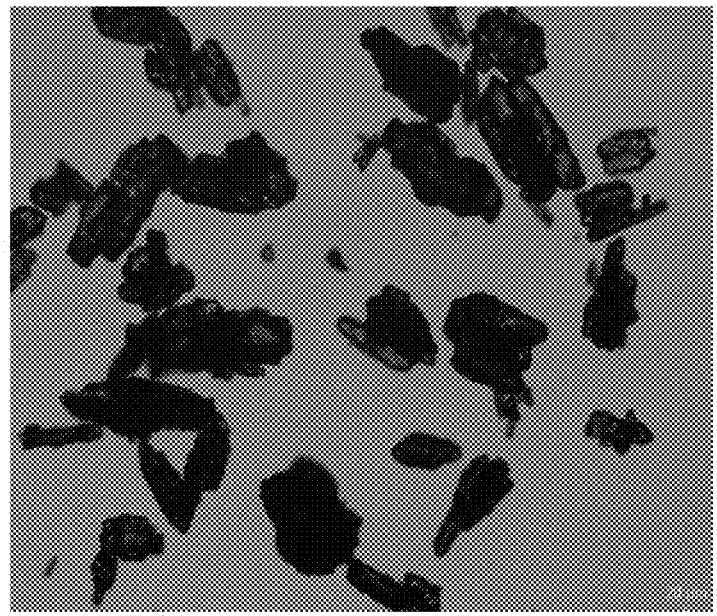
[Fig. 5]
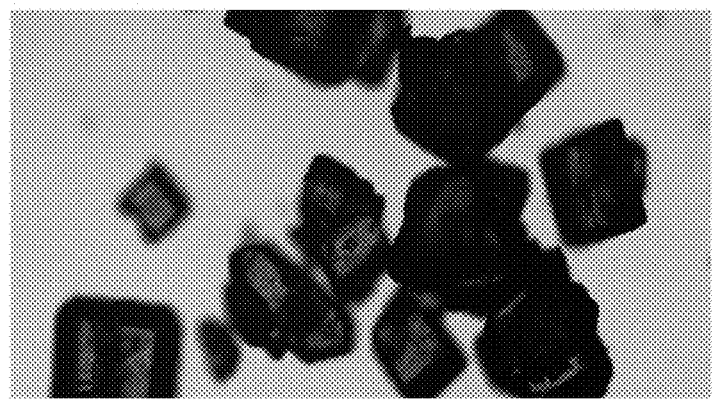

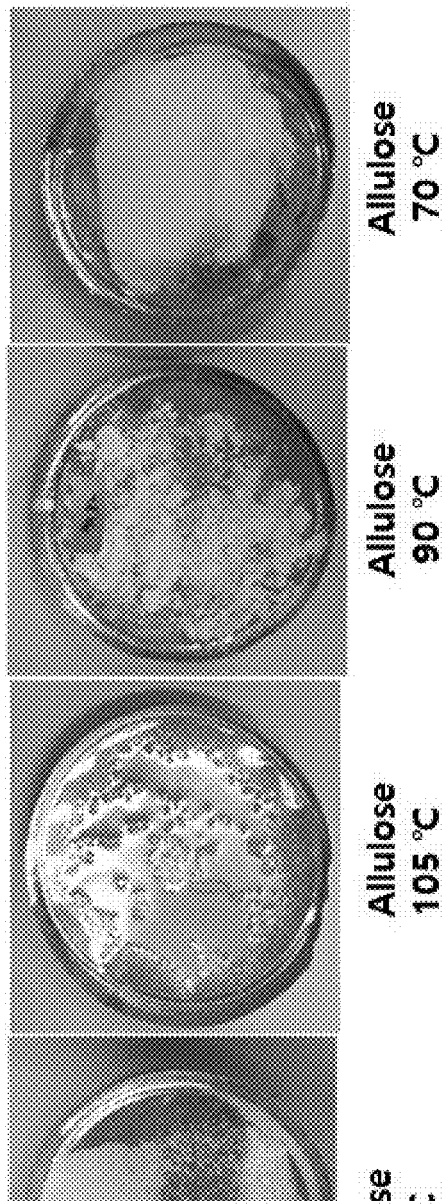
[Fig. 6]
BEST AVAILABLE IMAGE

[Fig. 7]
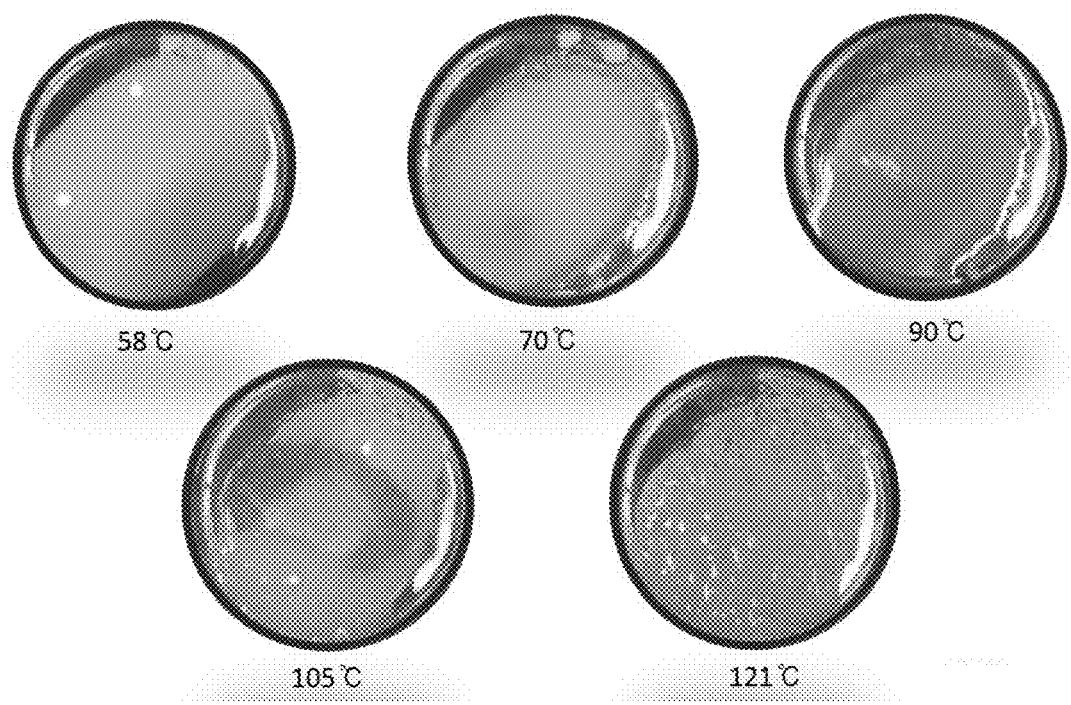

[Fig. 8]
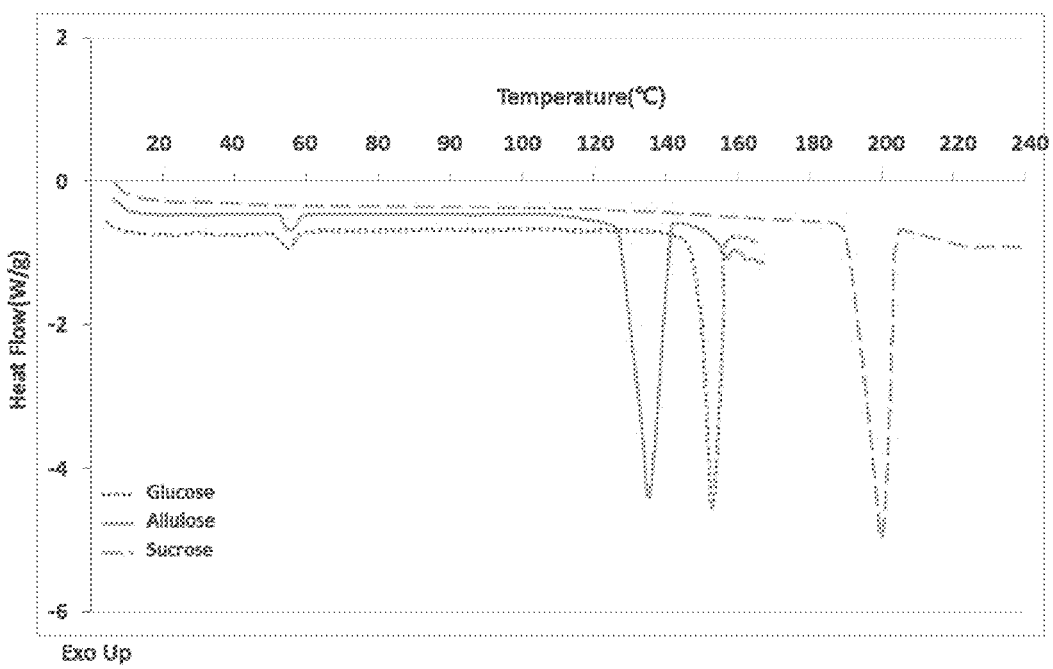

[Fig. 9]
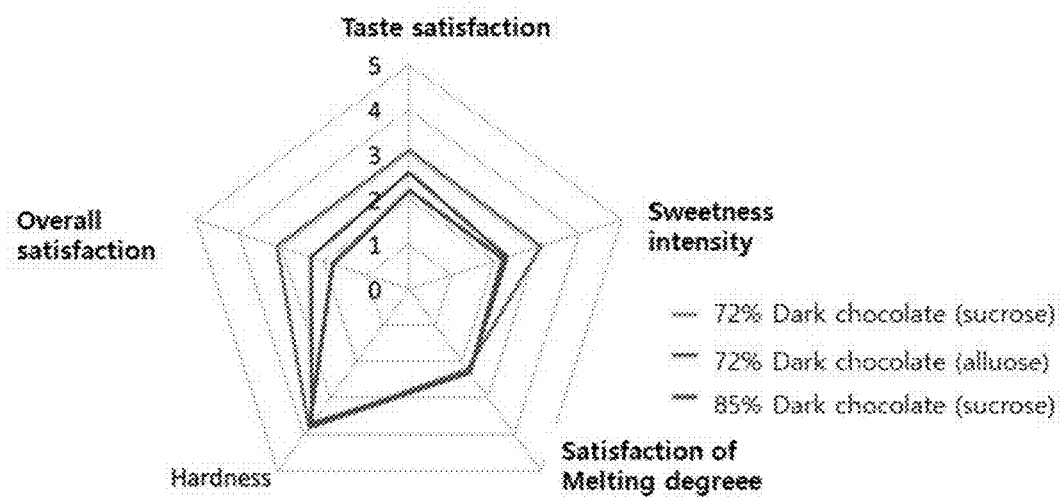

[Fig. 10]
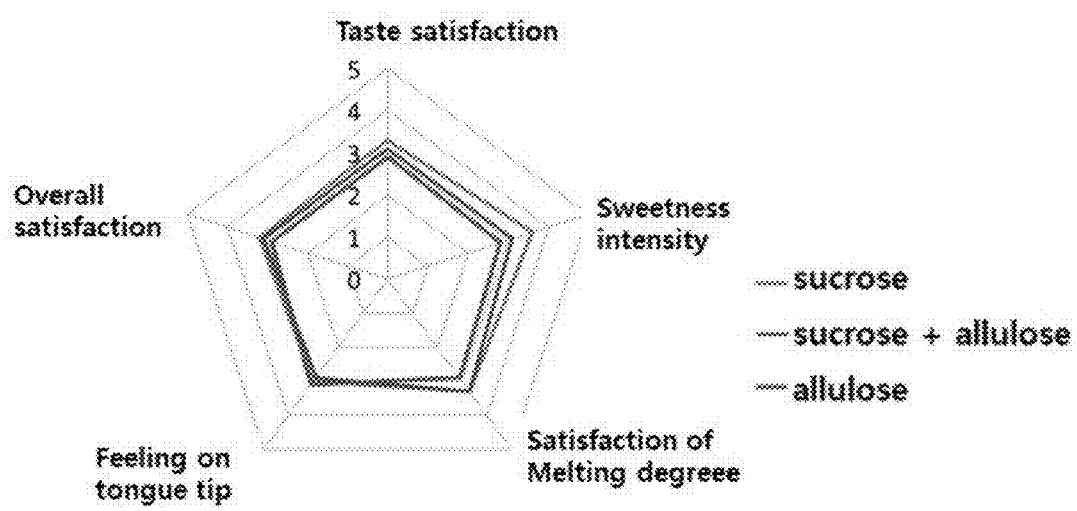

[Fig. 11]

CHOCOLATE COMPOSITION HAVING IMPROVED PROCESSABILITY, AND PREPARATION METHOD THEREFOR

TECHNICAL FIELD

The present invention relates to chocolate containing allulose and a method of preparing thereof, and more specifically, provides a chocolate composition having reduction of saccharides added to chocolate, masking of bitter taste of chocolate and excellent emulsion stability, and a method of preparing thereof.

BACKGROUND ART

Chocolate is a generic term for confectionary hardened by adding milk, butter, sucrose and flavoring to cacao dough, and it is consumed as snacks or desserts by itself due to characteristics of the product, but it has been widely used as raw materials of desserts and confectionery and bakery with its sweetness or other characteristics from the past. Conventional chocolate contains a large amount of fat such as coconut butter, resulting in high calories and it also contains a large amount of sucrose as saccharides, resulting in high calories and low fluidity. In addition, as the interest in low-calorie and health has increased recently, a product having a high cacao solid content comprising cacao mass and cacao butter and a low content of saccharides and/or dairy products, etc. has been released, but there is a problem in that the usage of sucrose is increased and the preference of consumers is low, because of the bitter taste of chocolate.

Sucrose has been a standard of sweeteners since the early days of the chocolate industry. Due to its sensual characteristics and technical characteristics, sucrose is particularly suitable for this type of confectionery products. On the other hand, its nutritional characteristics may be criticized. In fact, sucrose has a calorie value of 4 kcal/g, and therefore chocolate having sucrose as an essential important component has a high calorie value. Moreover, sucrose is an absolute contraindication to diabetes, because sucrose is made up of glucose and is rapidly assimilated by the living body, which can lead to severe hyperglycemia in diabetes patients. Sucrose may cause tooth decay because it can be fermented by oral symbiotic bacteria and converted to a corrosive acid.

To overcome these shortcomings, the idea to replace sucrose in chocolate with polyols has been developed. These polyols may be hydrogenated monosaccharides such as sorbitol, mannitol, xylitol, erythritol, or hydrogenated disaccharides such as maltitol, lactitol, hydrogenated isomaltulose (mixture of 1,6-glucopyranosyl sorbitol and 1,6-glycopyranosyl mannitol). In their pure state, these polyols do not have reducing power, and are not fermented into acid by oral bacteria flora. Therefore, they enable production of non-tooth erosive chocolate unless other ingredients provide fermentable sugar. In case of milk chocolate and white chocolate, milk can be replaced with lactose-free milk components to ensure such low-tooth erosion. Polyols are slowly metabolized and do not rapidly increase the blood glucose level after ingestion. As a result, they are often recommended for diets of diabetes patients. In addition, their calorie value is estimated to be 2.4 kcal/g (10.0 KJ/g) on average, and this is about 60% of sucrose.

Allulose is an epimer of carbon number 3 in fructose, and has sweetness equivalent to 70% of fructose, and is a functional saccharide which controls blood glucose, prevents cavities and inhibits lipogenesis in liver. Sugar alcohols which are widely used as an alternative sweetener of sucrose have side effects of causing diarrhea when consumed over a certain amount, etc., but allulose has no known side effects. Thus, the interest of allulose as a sweetener has been increased.

However, allulose has a problem of difficulty in production of chocolate itself, because a tangling phenomenon occurs in a conching process and therefore the conching process cannot be carried out, when inputted in a common chocolate production process, and thus it is necessary to solve a problem in that it is useful in reduction of saccharides as a non-fermentable saccharide, but it is difficult to be applied for chocolate.

DISCLOSURE

Technical Problem

An object of the present invention is to provide a chocolate composition having reduction of saccharides added to chocolate, masking of bitter taste of chocolate and excellent emulsion stability, and a method of preparing thereof.

Another object of the present invention is to provide chocolate containing allulose and a method of preparing thereof, which solve the problem of difficulty in producing chocolate itself, since a tangling phenomenon occurs in a conching process and the conching process cannot be performed.

Technical Solution

Hereinafter, the present invention will be described in more detail.

The chocolate composition according to the present invention may comprise cacao mass, cacao butter, saccharides and allulose, and may further comprise a dairy product.

Herein, chocolate is intended to include any food containing the aforementioned chocolate, and includes chocolate, compound chocolate and chocolate products in the food process. Despite of classification in the food process, herein, milk chocolate means to comprise a dairy product and cacao raw materials, and widely, it is intended to include milk chocolate, family milk chocolate and white chocolate. In addition, dark chocolate means a chocolate product which do not comprise a dairy product.

According to Food Standards Codex, chocolate refers to cacao mass, cacao butter, cacao powder, etc. obtained from the fruit of *Theobroma cacao*, or dark chocolate, sweet chocolate, milk chocolate, family milk chocolate, white chocolate, compound chocolate and processed chocolate products that are processed by adding food or food additives thereto.

Herein, chocolate is intended to include any food containing the aforementioned chocolate, and includes chocolate, compound chocolate and chocolate products in the food process. Despite of classification in the food process, herein, milk chocolate means to comprise a dairy product and cacao raw materials, and widely, it is intended to include milk chocolate, family milk chocolate and white chocolate. In addition, dark chocolate means a chocolate product which do not comprise a dairy product.

The chocolate composition according to the present invention includes cacao processed goods, and for example, it may include cacao mass, cacao butter and cacao powder, and preferably, it may include cacao mass and cacao butter. The cacao solid content in the food process means the content of cacao mass, cacao butter and cacao powder.

The cacao mass means that cacao fruit is roasted and then hulled and pulverized, and the cacao butter means fat obtained by pressing or solvent extraction after hulling cacao fruit which has a 33~42 iodine value. The cacao powder means that mass is powdered by roasting cacao fruit and then hulling and removing fat. The cacao mass and cacao butter can be applied to the present invention without any particular limitation as long as they are produced as ordinary cacao processed goods.

The cacao butter may be used by replacing it with a cacao butter equivalent (CBE) partially or wholly, and the cacao butter equivalent is characterized by containing triglyceride of POS and SOS at a weight ratio of 1:1 to 2:1. "POS" means a triglyceride in which oleic acid is located in the position of triglyceride sn-2 and palmitic acid and stearic acid; or stearic acid and palmitic acid are located in the position of sn-1,3, respectively. The term "SOS" used herein means a triglyceride in which oleic acid is located in the position of triglyceride sn-2 and stearic acid is located in the position of sn-1,3, respectively. The cocoa butter equivalent is similar to the triglyceride composition of cocoa butter having a high POS content and therefore exhibits an SFC (Solid Fat Content) curve of a steep slope unique to cocoa butter, so that it melts freshly in mouth, and it can be used as a cocoa butter equivalent, which is not hard and has a soft texture. The details for the cacao butter equivalent are disclosed in Korean Patent No. 10-1314683 in detail.

The chocolate composition according to the present invention may comprise 5 to 95 parts by weight, preferably, 10 to 85 parts by weight of cacao mass, based on 100 parts by weight of the solid content of the total chocolate composition. In addition, the cacao butter may comprise 5 to 50 parts by weight, preferably 7 to 45 parts by weight, based on 100 parts by weight of the total chocolate composition.

In an embodiment of the present invention, the dark chocolate composition may comprise 5 to 95 parts by weight, preferably 30 to 85 parts by weight of cacao mass, based on 100 parts by weight of the solid content of the chocolate composition, and 5 to 50 parts by weight, preferably 7 to 40 parts by weight of cacao butter.

In an embodiment of the present invention, the milk chocolate composition may comprise 5 to 95 parts by weight, preferably 7 to 40 parts by weight of cacao mass, based on 100 parts by weight of the solid content of the chocolate composition, and 5 to 50 parts by weight, preferably 10 to 35 parts by weight of cacao butter or its equivalent.

The chocolate composition according to the present invention may comprise an emulsifier, and may comprise 0.01 to 3 parts by weight, preferably 0.05 to 2 parts by weight, based on 100 parts by weight of the solid content of the total chocolate composition.

The emulsifier applicable to the present invention is a hydrophobic emulsifier, and may include one or more kinds selected from the group consisting of emulsifiers of which hydrophile-lipophile-balance (HLB) value is 0 to 6. Specific examples of the emulsifier may be monoglycerin fatty acid ester, sorbitan fatty acid ester and polyglycerin polyricinoleate as an emulsifier having HBL 6 or less, and the fatty acid is a fatty acid of carbon number 10 to 18, preferably a fatty acid of carbon number 16 to 18. The emulsifier specifically may use one or more of monoglyceride and diglyceride (MD), sorbitan monostearate (SMS), sorbitan tristearate (STS), polyglycerol ester (PGE), lactic acid ester of monoglyceride and diglyceride (LMD), phosphate ester of monoglyceride and diglyceride (PMD), diacetyl tartaric acid of monoglyceride (DATEM) and lecithin, and the lecithin may include soybean lecithin and yolk lecithin, preferably soybean lecithin, and the glycerin fatty acid ester may be monoglycerin stearic acid ester, and the sorbitan fatty acid ester may be sorbitan oleic acid ester or sorbitan stearic acid ester.

The chocolate composition according to the present invention may further comprise dairy product powder for preparation of milk chocolate, and the dairy product powder may be one or more kinds selected from the group consisting of powdered skim milk, whole milk powder, demineralized whey powder, lactose, whey powder, cream powder and butter milk powder. The dairy product powder may be comprised in an amount of 5 to 50 parts by weight, preferably 10 to 45 parts by weight, based on 100 parts by weight of the solid content of the total chocolate composition.

The chocolate composition according to the present invention may further comprise a quality improver such as cocoa butter improver (CBI) for preparation of chocolate.

The chocolate composition according to the present invention may further comprise cacao powder.

In an embodiment of the present invention, when the chocolate according to the present invention is dark chocolate which does not comprise a dairy product, it may comprise 5 to 95 parts by weight of cacao mass, 5 to 50 parts by weight of cacao butter, 0.01 to 3 parts by weight of an emulsifier, and 2 to 50 parts by weight of allulose, based on 100 parts by weight of the solid content of the chocolate composition.

In specific embodiment, when the chocolate according to the present invention is milk chocolate which comprises a dairy product, it may comprise 5 to 95 parts by weight of cacao mass, 5 to 50 parts by weight of cacao butter or its equivalent (CBE), 0.01 to 3 parts by weight of an emulsifier, 2 to 50 parts by weight of allulose and 5 to 50 parts by weight of dairy product powder, based on 100 parts by weight of the solid content of the chocolate composition.

The chocolate composition according to the present invention may comprise saccharides, and the saccharides may be allulose, or additionally one or more of other monosaccharides or disaccharides in addition to allulose. Therefore, by replacing saccharides such as sucrose used for chocolate preparation conventionally with allulose partially or entirely, a calorie problem according to the high content of saccharides and/or dairy products, etc. can be solved and a problem of low preference of consumers due to the bitter taste of chocolate with reduced saccharides, etc. can be solved.

However, when preparing chocolate using sucrose conventionally, commonly a conching process is performed at a temperature of about 80° C., but when performing conching under the same process conditions as sucrose for the composition in which a part or whole of sucrose is replaced with allulose, there is a problem of difficulty in preparation of chocolate itself as a tangling phenomenon occurs and therefore a conching process cannot be performed, so it is necessary to solve a problem of difficulty in chocolate applications.

The chocolate composition containing allulose according to the present invention solves a calorie problem by containing allulose in a certain content and solves low preference of consumers due to the bitter taste in case of chocolate with reduced saccharides, and solves a problem of difficulty in applying allulose for chocolate processes by performing a conching process within a certain temperature range.

The allulose may be comprised in an amount of 2 to 50 parts by weight, preferably 7 to 45 parts by weight, based on 100 parts by weight of the solid content of the total chocolate composition, and when further comprising one or more kinds of saccharide selected from the group consisting of sugar and glucose, the slightly reduced allulose content may be comprised.

When an additional sweetener other than allulose is added in the composition for preparing chocolate according to the present invention, one or more of saccharides selected from the group consisting of sucrose and glucose are replaced with allulose in the entire quantity and these saccharides are not comprised, or by replacing a part of these saccharides with allulose, a part of the total saccharides comprised in the chocolate composition is used as allulose and the other part is comprised as the sugar or glucose. The additional saccharides other than allulose may be comprised in an amount of 1 to 30 parts by weight, based on 100 parts by weight of the solid content of the total chocolate composition.

The allulose comprised in the cream composition according to the present invention may be allulose syrup, allulose powder, or a solution prepared at various concentrations using them. The allulose may comprise glucose, fructose and saccharides over disaccharides, in addition to allulose.

Allulose may be prepared by chemical synthesis or biological methods using an allulose epimerase, preferably biological methods, for example, microbial or enzyme reactions. For example, the allulose is a mixed saccharide or obtained therefrom, and the mixed saccharide may be a mixed saccharide prepared by reacting a composition for producing allulose comprising one or more kinds selected from the group consisting of an allulose epimerase, a microbial cell of a strain producing the epimerase, a culture of the strain, a lysate of the strain and an extract of the lysate or culture with fructose-containing raw materials, or obtained therefrom.

The allulose may be used as allulose only, or may be a mixed saccharide comprising additional other saccharides, and an example of the mixed saccharide may contain allulose of 1 to 99.9 parts by weight based on 100 parts by weight of the solid content of the total mixed saccharide and may further comprise one or more kinds selected from the group consisting of fructose, glucose and oligosaccharides, additionally. A specific example of the allulose-containing mixed saccharide may comprise allulose 2 to 55 parts by weight, fructose 30 to 80 parts by weight and glucose 2 to 60 parts by weight, and oligosaccharides 0 to 15 parts by weight, based on 100 parts by weight of the total solid content of the mixed saccharide, and may not comprise oligosaccharides. The allulose, fructose and glucose are preferably all a D-isomer.

The allulose syrup may be obtained from separation, purification and concentration processes from the mixed saccharide. In an embodiment of the present invention, the allulose syrup after separation and purification processes has an electrical conductivity of 1 to 50 μS/cm, and it may be allulose syrup comprising allulose 10% by weight or more in a liquid phase.

As an embodiment for preparation of allulose of the present invention, an expression system capable of producing an allulose epimerase with high expression rate and stability, a GRAS (Generally recognized as safer) microorganism using the same, and a method for producing allulose comprising an microorganism and an enzyme using the expression system, etc. are described in Korean Patent No. 10-1318422 and No. 10-1656063, etc. in detail.

One embodiment of the present invention provides a preparation method of a chocolate composition containing allulose. A specific embodiment of the chocolate preparation process according to the present invention comprises (A) a step of providing cacao mass, cacao butter and saccharides, (B) a step of obtaining a primary conching product in which allulose is uniformly dispersed by primary conching under a temperature condition of 45 to 60° C. in a conching machine, and a step of secondary conching by adding an emulsifier to the primary conching product, and (C) a step of tempering and molding.

Hereinafter, each step of the preparation method will be described in detail.

(A) Step of Providing Cacao Mass, Cacao Butter and Saccharides

In a specific embodiment, (A) step of providing cacao mass, cacao butter and saccharides may be carried out (A-1) while performing conching in a conching machine, and in this case, it is performed by a process of mixing saccharides after preparing a cacao paste by melting cacao mass and cacao butter under a temperature condition of 70 to 80° C. and a refining process is not performed.

Specifically, the (A) step of providing cacao mass, cacao butter and saccharides may be carried out by steps of preparing a cacao paste by melting cacao mass and cacao butter under a temperature condition of 70 to 80° C. while conching in a conching machine and cooling the cacao paste to 50 to 60° C. and mixing saccharides. The step of providing cacao mass, cacao better and saccharides, the step of obtaining a primary conching product, and the step of secondary conching may be performed in order while performing a conching process in a conching machine.

When (A) step is performed by the method, the preparation method of chocolate according to the present invention may comprise (A-1) a step of preparing a cacao paste by melting cacao mass and cacao butter under a temperature condition of 70 to 80° C. while conching in a conching machine and cooling the cacao paste to 50 to 60° C. and mixing saccharides, (B) a step of obtaining a primary conching product in which allulose is uniformly dispersed by primary conching under a temperature condition of 45 to 60° C. in a conching machine and a step of secondary conching by adding an emulsifier to the primary conching product, and (C) a step of tempering and molding.

The conching machine relates to conching equipment for cacao, and it performs functions of not only micronizing cacao endosperms by pulverizing but also facilitating oxidation of protein contained in cacao by heating cacao powder pulverized during the micronizing process.

In another specific embodiment, A) step of providing cacao mass, cacao butter and saccharides may perform (A-2) a step of melting cacao mass and cacao butter under a temperature condition of 40 to 60° C. and mixing saccharides, and performing refining treatment for the mixture to prepare a flake shaped refining mixture. When performing (A) step by such a process, it is performed by comprising a refining process.

The refining is a process of reducing a particle size to less than 25 micrometers by rolling the pasted obtained from the mixing step between steel rollers. This process converts the initial paste into fine powder which has hygroscopicity and can capture surrounding smell.

When performing (A) step by the method, the preparation method of chocolate according to the present invention may be performed by (A-2) a step of melting cacao mass and cacao butter under a temperature condition of 40 to 60° C. and mixing saccharides, and performing refining treatment by inputting the mixture to a refining machine to prepare a flake shaped refining mixture.

In an embodiment of the present invention, when preparing milk chocolate by adding dairy product powder, the dairy product powder may be mixed by adding in the step of mixing powder of saccharides.

Specifically, when preparing milk chocolate, it may be performed by (A-1) a step of preparing a cacao paste by melting cacao mass and cacao butter under a temperature condition of 70 to 80° C. while conching and cooling the cacao paste and mixing powder of saccharides and dairy product powder to the cacao paste of 50 to 60° C., or may be performed by (A-2) a step of mixing cacao mass, cacao butter, saccharides and dairy product powder under a temperature condition of 40 to 60° C., and performing refining treatment for the mixture to prepare a flake shaped refining mixture.

(B) Step of Performing Primary Conching and Secondary Conching

After performing the step of providing cacao mass, cacao butter and saccharides in the (A), to prepare the chocolate composition containing allulose according to the present invention, a step of obtaining a primary conching product in which allulose is uniformly dispersed by primary conching under a temperature condition of 45 to 60° C. in a conching machine and a step of secondary conching by adding an emulsifier to the primary conching product.

In the primary and secondary conching steps, the temperature may be within the range of 45 to 60° C. When the temperature is out of the above range, a tangling phenomenon of allulose occurs and therefore non-uniform dispersion occurs, and as a result, it is difficult to completely conduct the conching process.

The stirring rate and treatment time of the conching process is carried out according to common conching processes, and are not particularly limited. The conching is an essential process for changing taste of chocolate and improving properties, and it may continue for several hours to several days. The taste of chocolate appears in the conching process.

As the step of secondary conching by adding an emulsifier, to further improve such properties, an emulsifier is added to chocolate several hours before the conching is terminated. It is preferable to input the emulsifier in a liquid phase. The emulsifier coats saccharide particles and emulsifies remaining trace of water, to give excellent flow properties to chocolate, which is essential for the subsequent molding step.

(C) Step of Tempering and Molding

After completing the (B) conching process, a tempering process and a molding process are performed, and optionally a process of cooling and packaging may be further conducted.

The tempering of chocolate is a process for crystallizing cacao butter in a stable form. The molding is a process of shaping chocolate, and for example, makes it in a tablet form or a certain shape. During the cooling step, fat substances are aggregated in a stable form by crystallization when the tempering process is conducted well. The tempering and molding processes may be performed according to common process conditions such as treatment condition and time, etc., and are not particularly limited.

Chocolate may be a non-empty and dense solid form or a filled form filled with other things. There is also so-called cover-type chocolate for coating product surfaces such as cake, cereal bars, fruit candies, and the like.

The chocolate composition of the present invention may be prepared by further adding one or more kinds selected from the group consisting of flavoring, alcohol, wine, fruit juice, nuts and oligosaccharides additionally. The flavoring is not particularly limited as long as it can be used as a food additive, and it is preferable to input the flavoring in a liquid phase, and it may be added for the secondary conching process. The flavoring may be added in an amount of 0.0005 to 2 parts by weight, for example, 0.001 to 1.5 parts by weight, based on 100 parts by weight of the solid content of the chocolate composition.

Advantageous Effects

The present invention relates to chocolate containing allulose and a method of preparing thereof, and an object of the present invention is to provide a chocolate composition having reduction of saccharides added to chocolate, masking of bitter taste of chocolate and excellent emulsion stability

BRIEF DESCRIPTION OF DRAWINGS

FIG. 1 is photographs of milk chocolate prepared according to Examples 2 and 3 of the present invention and milk chocolate prepared according to Comparative example 3.

FIG. 2 is photographs of analysis of crystals of milk chocolate prepared according to Examples 2 and 3 of the present invention and milk chocolate prepared according to Comparative example 3.

FIG. 3 is a 100-fold magnification micrograph of milk chocolate and a 200-fold magnification micrograph of milk chocolate without controlling the conching temperature according to Comparative example 4.

FIG. 4 is a photograph showing the shape of crystals of the allulose powder according to Test example 2.

FIG. 5 is a photograph showing the shape of crystals of the sucrose powder according to Test example 2.

FIG. 6 is photographs showing the result of the melting point test of sucrose and allulose according to Test example 2.

FIG. 7 is photographs showing the result of the melting point test of allulose according to Test example 2.

FIG. 8 is a graph showing the result of DSC analysis of allulose according to Test example 2.

FIG. 9 is a graph showing the result of sensory evaluation of dark chocolate according to the example of the present invention.

FIG. 10 is a graph showing the result of sensory evaluation of milk chocolate according to the example of the present invention.

FIG. 11 is a photograph of the paste in which a tangling phenomenon occurs in the chocolate composition prepared according to Comparative example 4.

MODE FOR INVENTION

Hereinafter, the present invention will be described in more detail by the following examples. However, these examples are intended to illustrate the present invention only, but the scope of the present invention is not limited by these examples.

PREPARATIVE EXAMPLE 1: PREPARATION OF ALLULOSE

As allulose, allulose syrup was prepared from a fructose substrate by the substantially same biological method with the preparation method disclosed in Korean Patent No. 10-16173797.

Specifically, an encoding gene (DPE gene; Gene bank: EDS06411.1) of an allulose epimerase derived *Clostridiuim scindens* (*Clostridiuim scindens* ATCC 35704) was introduced into a recombinant vector (pCES_sodCDPE) and with the prepared recombinant vector (pCES_sodCDPE) plasmid, using electroporation, *Corynebacterium glutamicum* was transformed. Beads comprising the transformed *Corynebacterium glutamicum* cells were prepared and filled in an immobilization reaction column, and the allulose syrup of 24-26 (w/w) % in which glucose:fructose:allulose:oligosaccharides=6:67:25:2 was obtained from 95% by weight fructose of 40 Brix was obtained.

To remove impurities of colored and ionic components, etc., after demineralizing the allulose syrup by flowing through a column at a room temperature filled with a cation exchange resin, an anion exchange resin and a resin in which cation and anion exchange resins were mixed at a rate of 2 times (1~2 times) volume of an ion exchange resin per hour, a high purity of allulose solution was separated and obtained using chromatography filled with a calcium ($Ca^{2+}$) type of ion exchange resin. The high purity of allulose syrup was concentrated to 82Bx, and was cooled slowly from the temperature 35° C. to a supersaturated state to the temperature 10° C. to produce crystals. Then, without adding allulose seed crystals, the allulose crystals obtained in the crystallization step were collected by removing mother liquor by centrifugal dehydration and washing crystals with cooling water and then drying.

EXAMPLE 1. PREPARATION OF DARK CHOCOLATE

In the present example, dark chocolate was prepared without a refining process according to the bean to bar chocolate preparation method. Specifically, cacao beans after fermentation and drying processes were roasted at 132° C. for 30 minutes, and then hulls were removed and they were pulverized using a miller or roller, thereby preparing cacao mass. Sugar and allulose crystal powder were prepared by pulverizing.

A paste type was prepared from solid cacao nibs by mixing cacao mass and cacao butter and inputting them in a conching machine and performing a conching process under a 75° C. condition. Then, a primary conching process was performed under a temperature condition of 55° C. by inputting pulverized sugar and allulose powder, and a secondary conching process was performed by preparing and adding an emulsifier and flavoring in a liquid phase, thereby completing the conching process by progressing for about 72 hours finally. After tempering the conching-terminated combinations, they were poured into a plate mold and cooled in a cooling chamber of 10° C., and taken out of the mold and completed. The components and contents for chocolate preparation of Example 1 were shown in the following Table 1.

TABLE 1

| Classification (% by weight) | Comparative example 1 | Comparative example 2 | Example 1 |
| --- | --- | --- | --- |
| Cacao mass | 63.12 | 81.00 | 63.12 |
| Cacao butter | 9.02 | 4.50 | 9.02 |
| Sugar powder | 27.05 | 13.50 | 0.00 |
| Allulose (powder) | 0.00 | 0.00 | 27.05 |
| Soybean lecithin | 0.72 | 0.90 | 0.72 |
| Natural vanilla bean | 0.09 | 0.10 | 0.09 |
| Total | 100.0 | 100.0 | 100.0 |

COMPARATIVE EXAMPLES 1 AND 2. PREPARATION OF DARK CHOCOLATE USING SUGAR

In Comparative example 1, it was prepared by the substantially same method with the preparation method of dark chocolate of Example 1, but instead of allulose powder 27.05% by weight used in Example 1, sugar powder was used in the whole amount, and the content of soybean lecithin was changed.

In Comparative example 2, it was prepared by the substantially same method with the preparation method of dark chocolate of Example 1, but instead of allulose powder 27.05% by weight used in Example 1, sugar powder was used in the whole amount, and the content of cacao mass was increased, and the contents of cacao butter and soybean lecithin were changed.

EXAMPLES 2 AND 3. PREPARATION OF MILK CHOCOLATE

Raw materials described in the following Table 2 were prepared by measuring respectively, and cacao butter and cacao mass were prepared as a cacao paste by raising the temperature. To the cacao paste, whole milk powder, cacao mass and saccharides were inputted in order and mixed, and while maintain the temperature of the combination as 45° C., a mixing operation was progressed for about 15~20 minutes. After that, to make particles of 40 micrometers or less, a refining step for the combination with a three-stage roller refiner was performed by repeating twice.

After the refining step, a conching process for raw materials in a refined powder flake shape was performed under a temperature condition of 55° C. by raising the temperature, and after conching, when it was a paste phase, an emulsifier and flavoring were added, thereby completing the conching process by progressing for about 72 hours finally. When the conching process was completed, a tempering step was progressed. After tempering the conching-terminated combination, they were poured into a plate mold and cooled in a cooling chamber of 10° C., and taken out of the mold and completed. The photographs of milk chocolate of Examples 2 and 3 were shown in FIG. 1.

TABLE 2

| Classification (% by weight) | Comparative example 3 | Example 2 | Example 3 |
| --- | --- | --- | --- |
| Cacao mass | 12.65 | 12.65 | 12.65 |
| Cacao butter | 19.03 | 19.03 | 19.03 |
| Whole milk powder | 29.48 | 29.48 | 29.48 |
| Sugar powder | 38.37 | 0.00 | 19.185 |
| Allulose (powder) | 0.00 | 38.37 | 19.185 |
| Soybean lecithin | 0.41 | 0.14 | 0.14 |
| Natural vanilla | 0.05 | 0.05 | 0.05 |
| Total | 100.00 | 100.00 | 100.00 |

COMPARATIVE EXAMPLE 3: PREPARATION OF MILK CHOCOLATE USING SUGAR

By the substantially same method with Example 2, milk chocolate was prepared with the components and contents described in Table 2 above. In other words, instead of using allulose powder 38.37% by weight in Example 2, using sugar powder 38.37%, milk chocolate was prepared. The photograph of the prepared milk chocolate of Comparative example 3 was shown in FIG. 1.

COMPARATIVE EXAMPLE 4: PREPARATION OF MILK CHOCOLATE WITH DIFFERENT PROCESS CONDITIONS

Milk chocolate was prepared with the components and contents described in Table 2 above, by the substantially same method with Example 2, the conching temperature used in the conventional chocolate preparation process using sugar as a saccharide was 80° C. When performing the conching process under the preparation conditions, the tangling phenomenon of the cacao paste occurred due to addition of allulose and the conching process could not be completed, and it could be observed with naked eyes that mass of saccharides was tangled in the cacao paste. The photograph of the paste in which the tangling phenomenon occurred was shown in FIG. 11.

TEST EXAMPLE 1. ANALYSIS OF CHOCOLATE PROPERTIES

Test Example 1-1: Microscope Observation

About 1-2 g of chocolate was applied to a slide glass by spreading it thinly, and then it was covered with a curved glass, and it was observed with an optical microscope. It was confirmed as observation magnification was 100-fold and 200-fold.

In case of chocolate according to milk chocolate using only sugar (Comparative example 3), as shown in FIG. 2, it was shown that the brown part was cacao mass, and the lightly colored mass part was powdered milk, and the white part was sugar, but it could be confirmed that in general, in case of milk chocolate in which sugar was applied, it was uniformly dispersed.

The microscopic photograph of the cacao paste prepared with different conching temperature from Example 2 according to Comparative example 4 was shown in FIG. 3, and the top photograph was a 100-fold magnification photograph and the bottom photograph was a 200-fold magnification photograph. As shown in FIG. 3, as the result of applying allulose to the milk chocolate prepared according to the method of Comparative example 4 and observing it with a microscope, the amorphous shape rather than crystals could be observed with the magnified photograph (×200-fold) of the faint part. To confirm whether this was due to the moisture content or melting point of allulose, the moisture content measurement, phase change temperature and energy evaluation and melting point test were progressed.

The result of observing crystals of the milk chocolate according to Examples 2 and 3 was shown in FIG. 2. As shown in FIG. 3, it was shown that the brown part was cacao mass, and the lightly colored mass part was whole milk powder, and the white part was sugar, but it was observed with naked eyes that milk chocolate was uniformly dispersed well.

Test Example 1-2: Chocolate Moisture Content Measurement

Satorious infrared ray moisture measuring instrument was used, and the moisture content of milk chocolate 3 g of Comparative example 4 was measured, and it was stopped when there was no change of 1 mg for 36 seconds. As the result of moisture measurement of the milk chocolate of Comparative example 4, it was analyzed that it had the moisture content of about 0.18%. As the result of this moisture content analysis, it could be confirmed that the problem of the conching process was not caused by the moisture content in case of the milk chocolate containing allulose of Comparative example 4.

TEST EXAMPLE 2: ANALYSIS OF PROPERTIES OF ALLULOSE AND SUGAR

In order to investigate causes of the problem of Comparative example 4, for the component, saccharides, the evaluation of crystal structure, melting point and phase change temperature and energy was performed.

2-1: Confirmation of Structure of Crystals of Saccharides

The photographs of crystals of the allulose powder of Preparative example 1 and the sugar powder used in Example 1 and Comparative example 2 were shown in FIG. 4 and FIG. 5, respectively. It was confirmed that the allulose powder of FIG. 4 was irregular differently from the crystals of the sugar of FIG. 5, and therefore, an experiment of the meltability of allulose crystals was to be carried out.

2-2: Experiment of Meltability of Crystals of Saccharides

As the test of the meltability of sugar and allulose, 4 samples in total comprising 1 sugar and 3 allulose were prepared, and each of them was checked while putting them in an oven under a temperature condition of 105° C. for sugar, and 70° C., 90° C. and 105° C. for allulose, and the result was shown in FIG. 6. As the result of the experiment, it could be confirmed that allulose was melted down rapidly than sugar.

In order to confirm the changes and melting points of allulose depending on the temperature, one allulose sample was put in a hot plate, and the changes of allulose were confirmed with naked eyes while raising the temperature gradually, and a photograph was taken and shown in FIG. 7. As the result of the experiment, the changes of allulose depending on the temperature started slowly to occur from about 58° C.

2-3: Evaluation of Phase Change Temperature and Energy of Allulose

Sample amounts of 4~6 mg was taken, and DSC analysis (phase change temperature measurement was conducted by confirming the phase change temperature by setting the temperature to 200° C. by raising the temperature at a rate from 20 to 10/min and using TA instrument DSC, and the result was shown in FIG. 8. As a result, it could be confirmed that the DSC measurement result of allulose showed a similar pattern with glucose than the result of sugar, and the phase change occurred at 55° C. to 60° C.

TEST EXAMPLE 3. SENSORY EVALUATION OF DARK CHOCOLATE

The sense and preference of chocolate were evaluated for researchers, and according to the following evaluation criteria, for sensory evaluation on various items, 11 panelists (20~40 s, male and female), who were professionally trained, tasted it and evaluated on the following 5-point scale.

The evaluation items were hardness, taste satisfaction, sweetness intensity, satisfaction of melting degree and overall satisfaction. The result of the evaluation was shown in FIG. 9.

As shown in FIG. 9, the hardness was shown as similar in the three samples, and the quality level was low as the overall satisfaction of chocolate (72%) of Comparative example 1 was 3.1, and in case of chocolate containing allulose of Example 1, the sweetness was similar to dark chocolate (85%) of Comparative example 2, but the bitter taste was weaker than dark chocolate of Comparative example 2. The overall preference was shown in the order of Comparative example 1 (72% sugar) >Example 1 (72% allulose) >Comparative example 2 (85% sugar).

TEST EXAMPLE 5. SENSORY EVALUATION OF MILK CHOCOLATE

The sense and preference of chocolate were evaluated for researchers, and according to the following evaluation criteria, for sensory evaluation on various items, 15 panelists (20~40 s, male and female), who were professionally trained, tasted it and evaluated on the following 5-point scale.

The evaluation items were feeling on the tongue tip, taste satisfaction, sweetness intensity, satisfaction of melting degree and overall satisfaction. The result of the evaluation was shown in FIG. 10.

As shown in FIG. 10, the tongue tip touch and overall satisfaction were shown as similar in the three samples, and the sweetness intensity was decreased in the order of Comparative example 3, Example 3 and Example 2.

The invention claimed is:

1. A chocolate composition, comprising cacao mass, cacao butter or cacao butter equivalent (CBE), saccharides containing allulose, and an emulsifier,
    wherein the saccharides contain allulose in an amount of 2 to 50 parts by weight based on 100% by weight of the chocolate composition,
    wherein the allulose is uniformly dispersed in chocolate, and
    wherein the composition comprises particles having a particle size of about 15 to 40 micrometers,
    wherein the chocolate composition is prepared by a preparation method comprising:
    a step of obtaining a primary conching product by primary conching under a temperature condition of 45 to 60° C., and
    a step of secondary conching by adding an emulsifier to the primary conching product under a temperature condition of 45 to 60° C., and
    wherein the allulose is provided as a mixed saccharide syrup or a powder form prepared from the mixed saccharide syrup, and the mixed saccharide comprises allulose of 1 to 99.9 parts by weight based on 100 parts by weight of the solid content of the total mixed saccharide, and at least one selected from the group consisting of fructose, glucose and oligosaccharides.

2. The composition according to claim 1, wherein the chocolate is dark chocolate, sweet chocolate, milk chocolate, family milk chocolate, white chocolate, compound chocolate or a chocolate processed product, and wherein the cacao mass is 5 to 95 parts by weight, and the cacao butter or CBE is in an amount of 5 to 50 parts by weight, based on 100 parts by weight of the solid content of the chocolate composition.

3. The composition according to claim 1, further comprising dairy product powder of 5 to 50 parts by weight, based on 100 parts by weight of the solid content of the total chocolate composition.

4. The composition according to claim 1, wherein the emulsifier has HLB value of 0 to 6, and is selected from the group consisting of lecithin, monoglycerin fatty acid ester, sorbitan fatty acid ester and polyglycerin polyricinoleate.

5. The composition according to claim 1, wherein the saccharides further comprise one or more kinds selected from the group consisting of sucrose and glucose.

6. The composition according to claim 1, comprising flavoring agent at 0.0005 to 2 parts by weight, based on 100 parts by weight of the solid content of the composition.

7. The composition according to claim 1, wherein the chocolate composition is prepared by a preparation method of a chocolate composition further comprising:
    a step of providing cacao mass, cacao butter or CBE and saccharides,
    and
    a step of tempering and molding.

8. The composition according to claim 7, wherein the step of providing cacao mass, cacao butter or CBE and saccharides is performed by a step of melting cacao mass and cacao butter under a temperature condition of 70 to 80° C., cooling a cacao paste, and a step of mixing the cacao paste having a temperature of 50 to 60° C., with the saccharides.

9. The composition according to claim 8, wherein the step of providing cacao mass, cacao butter or CBE and saccharides, the step of obtaining a primary conching product, and the step of secondary conching are performed while a conching process is carried out.

10. The composition according to claim 7, wherein the step of providing cacao mass, cacao butter or CBE and saccharides is performed by a step of melting cacao mass and cacao butter under a temperature condition of 40 to 60° C. and mixing powder of saccharides, and performing refining treatment to the mixture, to prepare a flake shaped refined mixture.

11. A preparation method of a chocolate composition comprising cacao mass, cacao butter or cacao butter equivalent (CBE), saccharides containing allulose and an emulsifier, comprising
    a step of providing a raw material comprising cacao mass, cacao butter or CBE, and saccharides containing allulose,
    a step of obtaining a primary conching product in which allulose is uniformly dispersed, by primary conching the raw material under a temperature condition of 45 to 60° C., and a step of secondary conching by adding an emulsifier to the primary conching product under a temperature condition of 45 to 60° C., and
    a step of tempering and molding,
    wherein the saccharide contains allulose in an amount of 2 to 50 parts by weight based on 100% by weight of the chocolate composition,
    wherein the allulose is provided as a mixed saccharide syrup or a powder form prepared from the mixed saccharide syrup, and the mixed saccharide comprises allulose of 1 to 99.9 parts by weight based on 100 parts by weight of the solid content of the total mixed saccharide, and at least one selected from the group consisting of fructose, glucose and oligosaccharides, wherein the chocolate composition comprises particles having a particle size of about 15 to 40 micrometers.

12. The preparation method according to claim 11, wherein the emulsifier is added in a liquid phase.

13. The preparation method according to claim 11, wherein the step of providing the raw material comprising cacao mass, cacao butter or CBE and saccharides is performed by a step of melting cacao mass and cacao butter under a temperature condition of 70 to 80° C. while conching, and preparing and cooling a cacao paste, and mixing powder of saccharides to the cacao paste of 50 to 60° C.

14. The preparation method according to claim 13, wherein the step of providing the raw material comprising cacao mass, cacao butter or CBE and saccharides, the step of obtaining a primary conching product, and the step of secondary conching are performed while a conching process is carried out.

15. The preparation method according to claim 13, wherein the cacao mass is obtained by roasting cacao beans after fermentation and drying processes, removing their hulls and pulverizing them.

16. The preparation method according to claim 13, including performing, a step of preparing a cacao paste by inputting cacao mass and cacao butter or CBE powder and melting them under a temperature condition of 70 to 80° C., and mixing saccharides powder to the cacao paste, and conching them under a temperature condition of 45 to 60° C., to obtain a conching product in which allulose is uniformly dispersed.

17. The preparation method according to claim 11, wherein the step of providing the raw material comprising cacao mass, cacao butter or CBE and saccharides is performed by a step of melting cacao mass and cacao butter under a temperature condition of 40 to 60° C. and mixing powder of saccharides, and performing refining treatment to the mixture, to prepare a flake shaped refined mixture.

18. The preparation method according to claim 11, wherein the step of providing the raw material comprising cacao mass, cacao butter or CBE and saccharides is performed by steps of preparing a cacao paste by melting while conching under a temperature condition of 70 to 80° C., and cooling the cacao paste and mixing powder of saccharides and powder of the dairy product to the cacao paste of 50 to 60° C.

19. The preparation method according to claim 11, wherein the step of providing the raw material comprising cacao mass, cacao butter or its equivalent and saccharides is performed by a step of mixing cacao mass, cacao butter or its equivalent, saccharides and powder of the dairy product under a temperature condition of 40 to 60° C., and performing refining treatment to the mixture, to prepare a flake shaped refined mixture.

\* \* \* \* \*